United States Patent
Sato (10) Patent No.: US 8,685,359 B2
(45) Date of Patent: Apr. 1, 2014

(54) ATOMIC CARBON MATERIAL AND METHOD FOR PREPARATION THEREOF

(76) Inventor: Kunimichi Sato, Nakano-ku (JP)

( * ) Notice: Subject to any disclaimer, the term of this patent is extended or adjusted under 35 U.S.C. 154(b) by 597 days.

(21) Appl. No.: 11/547,560

(22) PCT Filed: Apr. 5, 2005

(86) PCT No.: PCT/JP2005/006631
§ 371 (c)(1),
(2), (4) Date: Dec. 1, 2008

(87) PCT Pub. No.: WO2005/097675
PCT Pub. Date: Oct. 20, 2005

(65) Prior Publication Data
US 2009/0202423 A1    Aug. 13, 2009

(30) Foreign Application Priority Data

Apr. 5, 2004   (JP) ................... 2004-111203

(51) Int. Cl.
*C09C 1/56* (2006.01)
*C01B 31/02* (2006.01)
*B01J 19/08* (2006.01)
*C01B 31/00* (2006.01)
*C01B 25/00* (2006.01)
*C01B 31/04* (2006.01)
*C01D 3/00* (2006.01)

(52) U.S. Cl.
USPC ........... 423/414; 423/460; 423/445; 423/274; 423/448; 423/449

(58) Field of Classification Search
None
See application file for complete search history.

(56) References Cited

U.S. PATENT DOCUMENTS 6,558,644 B1 *  5/2003  Berman ............... 423/445 R

FOREIGN PATENT DOCUMENTS

| CN | 1390780 A | 1/2003 |
| JP | 11-99332 | 4/1999 |
| JP | 2002-121564 | 4/2002 |

OTHER PUBLICATIONS

Tokio et al.; Translation Japanese Pub. No. 2002-121564; 2010.*
Welham et al.; Extended Milling of Graphite and Activated Carbon; Carbon; vol. 36, No. 9. pp. 1309-1315; 1998.*
Frederick et al.; Carbon and Char Residue Yields from Rapid Pyrolysis of Kraft Black Liquor; Bioresources Technology; 77, pp. 131-138; 2001.*

* cited by examiner

*Primary Examiner* — Guinever Gregorio
(74) *Attorney, Agent, or Firm* — Browdy and Neimark, PLLC (57) ABSTRACT

An atomic carbon material and a preparation method thereof having ion adsorption ability superior to fullerenes and nanotubes are provided. This atomic carbon material is in a state existing as an organic compound and in a state close to an atom with a diameter of 1 nm or less (theoretically about 1.66 angstrom), and is a bulk where they are congregated with each other with an interatomic force or a particle with a particle size of 1 nm or less. This atomic carbon material is manufactured by heating a raw material composed of an organic material which does not include carbon units in an inactive atmosphere at a predetermined temperature while sequentially increasing the temperature and by individually separating expected elements except for carbon in the aforementioned atmosphere and the organic material from being bonded with carbon by thermally decomposing in order from an element having a lower decomposition temperature at a temperature of 450 C or lower.

5 Claims, 8 Drawing Sheets

FIG. 1

Sample

FIG. 2

Photograph of Transmission Microscope
2,000,000×

Sample No.

Photograph of Transmission Microscope
2,000,000×

BLACK FLOATING MATTERS

CALCIUM CARBONATE;CALCIUM(II)CARBONATE(1:1);CAMEL-FIL;CHALK;Li 1/cm

ATOMIC CARBON MATERIAL AND METHOD FOR PREPARATION THEREOF

FIELD OF INVENTION

The present invention relates to an atomic carbon material which is useful for various carbon materials and a method for preparation thereof.

BACKGROUND OF THE INVENTION

Carbon is one of the important components of all organic materials and vital activities and, yet it is a nonmetal and has many advantages such that it has not only high conductivity of heat and electricity and small coefficient of thermal expansion but also strong stability against chemicals, so that it is utilized in many fields.

The carbon atom has four valence electrons and three or four hands (dangling bonds) which are not combined.

Moreover, carbon has been conventionally known as molecular, and allotropes which have four crystalline structures such as graphite, diamond, fullerene, and carbon nano-tubes have been known.

Specifically, since fullerene and carbon nano-tubes are fine and have characteristics such as large ion adsorption ability that conventional graphite does not have, they have been drawing attention as a new carbon material in the field of nano-carbons, studied in various fields, and put into practical use.

However, fullerenes and carbon nano-tubes are manufactured by heating and evaporating coke and a high polymer using, for instance, plasma, lasers, etc. Therefore, fullerenes and carbon nano-tubes are graphitized as a huge carbon allotrope where the covalent bonds made of six carbon atoms are included.

Each carbon material has only one ion adsorption ability, so that the ion adsorption ability of a fullerene composed of 60 carbon atoms is 60 at the most, and that of a nano-tube composed of 1000 carbon atoms is 1000 at the most.

Moreover, the oxidation compound is vaporized by applying heat-treatment to coke at 800° C. or higher and an allotrope of carbon can be obtained, but graphitization is accelerated and the coke hardens progressively.

Furthermore, it is known that hydrogen and oxygen are taken by sequentially cutting from the hand which has weak bonding when an organic material is heated, and it gradually changes (carbonized) to a material composed of only carbon. In Japan, "Charcoal" has been made since old times by carbonizing plants.

SUMMARY OF THE INVENTION

"Charcoal" carbonized at low temperatures in a conventional method is generally known as a non-crystalline (amorphous) material which has low electrical conductivity. However, it is difficult to reduce carbon and oxygen in a conventional carbonization technique if it is not heated up to high temperatures, so that a pure carbon material cannot be obtained.

Moreover, in order to lose oxygen and hydrogen, it is necessary to prepare it at high temperatures and the obtained carbide (charcoal) is one where covalently bonded six carbon atoms are lined in front, back, left and right directions and crystallized (graphitized) to each other; the stacked electrical conductivity is high and becomes extremely stable, and it is difficult to combine it with other materials. Therefore, it continues to be used as a material with excellent physical characteristics.

The problems to be solved by the present invention are to provide an extremely useful atomic carbon material, which has ion adsorption ability (ability to combine with other materials) far better than fullerenes and nano-tubes, and to provide a method for preparation thereof.

The present invention to solve the aforementioned problems provides an atomic carbon material in which carbon atoms or ultra fine particles in a state where from two to five or about ten carbon atoms are linearly bonded (so-called atomic carbon particles) are disorderly congregated with each other with an interatomic force and appear as an amorphous bulk, or an atomic carbon material having the particle size of ultra fine particles composed of carbon in a state where from two to five or about ten carbon atoms are linearly bonded.

Moreover, a method for preparation in the present invention is characterized in that a covalent bonded organic material which does not contain a carbon unit (preferably, an organic material such as plants mainly composed of carbon, oxygen, and hydrogen) is used and this organic material in an inactive atmosphere (for instance, a nitrogen atmosphere) is heated at a predetermined temperature while sequentially increasing the temperature; expected elements except for carbon (for instance, gaseous elements such as oxygen and water vapor, etc) in the aforementioned atmosphere and the organic material are individually separated from being bonded with carbon by thermally decomposing in order, from an element having a lower decomposition temperature at a temperature of 450 C or lower; and the aforementioned decomposed elements are exhausted each time of separation to outside of the atmosphere under a condition where the inactive atmosphere is maintained. Furthermore, it is characterized by cooling the obtained bulk atomic carbon to 450 C or less in an inactive atmosphere and by grinding ultra fine particles in the state where from two to five or about ten carbon atoms are linearly bonded.

An atomic carbon material of the present invention has an ion absorption ability which is four times the ion absorption ability of a fullerene 60 composed of 60 carbon atoms, that is, 240. Specifically, an atomic carbon material of the present invention has an ion absorption ability which is four times the ion absorption ability of a carbon nano-tube 1000 composed of 1000 carbon atoms, that is, 4000, so that it is very active and can be utilized for various applications.

Moreover, an atomic carbon material of the present invention has particulates or ultra fine particulates, which is different from conventional graphitized carbons. In addition, not only is it fine but also it can create compounds with various materials. Furthermore, being composed of carbon, since it does not possess toxicity relative to the human body, a variety of excellent applications in medicine, health care materials, and beauty products, etc. can be expected.

The above-mentioned purposes and the advantages of the present invention will be explained referring to the accompanying drawings, and will be clarified furthermore by the following embodiments.

DETAILED DESCRIPTION OF THE PREFERRED EMBODIMENTS

Figure 1:
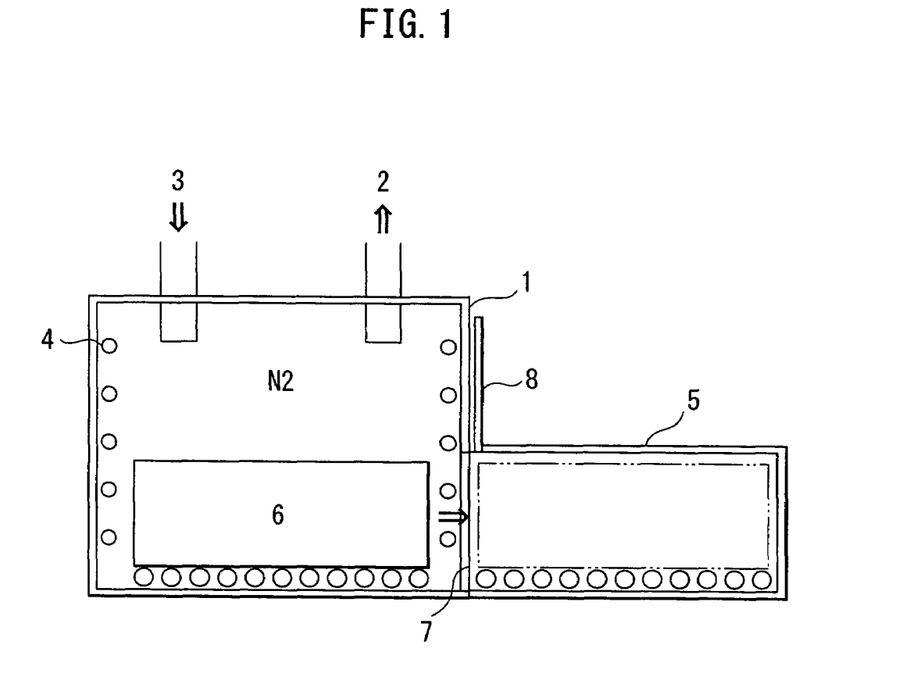
FIG. 1 is a cross-sectional drawing schematically illustrating a configuration of a preferable basic device for a preparation method of an atomic carbon material in the present invention.

Next, the best modes to execute this invention will be explained referring to accompanying drawings. FIG. 1 shows an example of a device for preparation to execute the preparation method of an atomic carbon material in the present invention. It includes an airtight chamber 1 to which air does not enter and lines having a nitrogen injection shut-off valve 2 and a pyrolysis gas exhaust shut-off valve 3. A heater 4 is mounted inside to raise the temperature up to a predetermined temperature. Moreover, it is formed of a cartridge 5 which has the same atmosphere as the airtight chamber 1 (nitrogen atmosphere) for taking out carbon, an organic material, and a stand 6. The cartridge 5 is detachable from the airtight chamber 1. In FIG. 1, 7 denotes a shutter provided at the gateway of the organic material and the stand 6 in the airtight chamber 1, and, when it is closed, the airtight chamber 1 is kept airtight or in a nitrogen atmosphere. 8 denotes a cover or a shut-off door provided in the cartridge 5, and, when it is closed, the cartridge 5 can be kept airtight or in nitrogen atmosphere.

Next, in order to prepare an atomic carbon material of the present invention, a raw material (organic material such as wood and bamboo, etc.) is first put in the stand 6 and loaded in the airtight chamber 1 in which the heater 4 is mounted. Then, nitrogen is injected from the nitrogen injection shut-off valve 2, and, at the same time, air inside is exhausted from the pyrolysis gas exhaust shut-off valve 3 to generate a nitrogen atmosphere in the inside of the airtight chamber 1 and the cartridge 5, and it is heated up by using the heater 4. As a first step, since the raw material is one including water, it is kept at a temperature from 100 C to 150 C (150 C is more preferable) to evaporate water sufficiently and the evaporated water is exhausted from the airtight chamber 1. At the same time, it is preferable that the same amount of nitrogen be injected from the nitrogen injection shut-off valve 2 to keep the inside of the airtight chamber 1 in a state where the organic material which is a raw material is not oxidized, that is, an airtight nitrogen atmosphere. Moreover, the raw material being in a fully dried state is successively heated by using the heater 4 up to a temperature from 350 C to 450 C to decompose the elements contained in the raw material. It is necessary that all elements of the raw material generated until the temperature reaches 450 C are exhausted to outside of the airtight chamber and nitrogen is injected every time to keep it in an inactive atmosphere. Then, the elements in the raw material which are bonded with carbon separate the remaining carbon and an atomic carbon material of the present invention which does not evaporate at 450 C remains. Herein, as characteristics of carbon, the excitation energy for allotropic bonding in which carbon in an organic state is crystallized and becomes inorganic, that is, graphitization requires a high temperature of 450 C or higher. Therefore, it is necessary for an atomic carbon material of the present invention to be made at 450 C or lower in order not to form graphite. Then, the heater 4 is stopped and cold nitrogen is injected from the nitrogen injection shut-off valve 2, and, at the same time, hot nitrogen gas inside is exhausted from the pyrolysis gas exhaust shut-off valve 3 to cool down the inside of the airtight chamber 1 and the cartridge 5 to about 50 C to 100 C. After that, the atomic carbon material is transferred from the airtight chamber 1 to the cartridge 5 with the stage 6, the cover 8 of the cartridge 5 is closed, and it is separated from the airtight chamber 1 while maintaining a nitrogen atmosphere inside of this cartridge 5. The shutter 7 of the airtight chamber 1 is closed for preparing the next operation.

The remaining carbon is composed of carbon atoms or ultra fine particles in a state where from two to five or about ten carbon atoms are linearly bonded (FIG. 2) and amorphous atomic carbon can be obtained in which these ultra fine particles are disorderly congregated with each other with an interatomic force. Moreover, after the atomic carbon material is completed in each process, the cartridge 5 is required to be sealed up and stored while maintaining a nitrogen atmosphere which does not oxidize the carbon in order to make full use of the capabilities as a material. Since the atomic carbon material kept in the cartridge 5 never touches air, it does not combine with oxygen and other materials. The atomic carbon material, which does not combine with oxygen and other materials, is ground to become particles or ultra fine particles, if necessary. Grinding the atomic carbon material may be carried out in any preparation process after obtaining the atomic carbon material. For instance, it can be ground to be ultra fine particles in an inactive atmosphere at a temperature of 450 C or lower in the airtight chamber 1 in the process before taking it in the cartridge 6 in a sealed state. Alternatively, after cooling to about from 50 C to 100 C, it may be ground in ultra fine particles in an inactive atmosphere in the airtight chamber 1. Moreover, after the aforementioned cooling, it may be taken in the cartridge 6 and transferred in a sealed state and a grinding process may be applied by using a grinding machine. Since the aforementioned atomic carbon does not combine with oxygen or other materials, it creates highly negative ion water (pH becomes 11 or more) having high reactivity when it is mixed in water.

Figure 2:
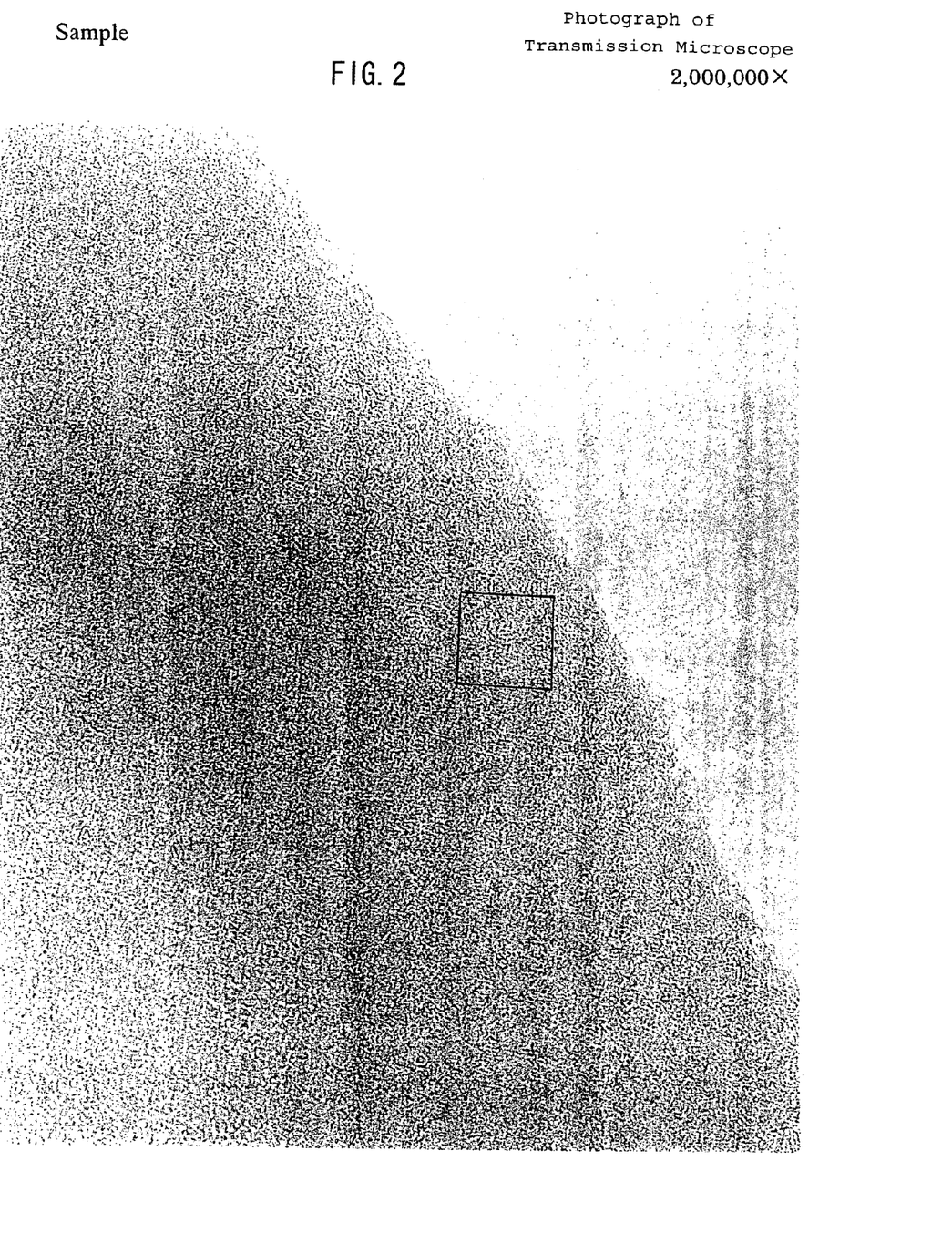
FIG. 2 is an electron micrograph of an atomic carbon material at a magnification of two million times in the present invention.
Figure 3:
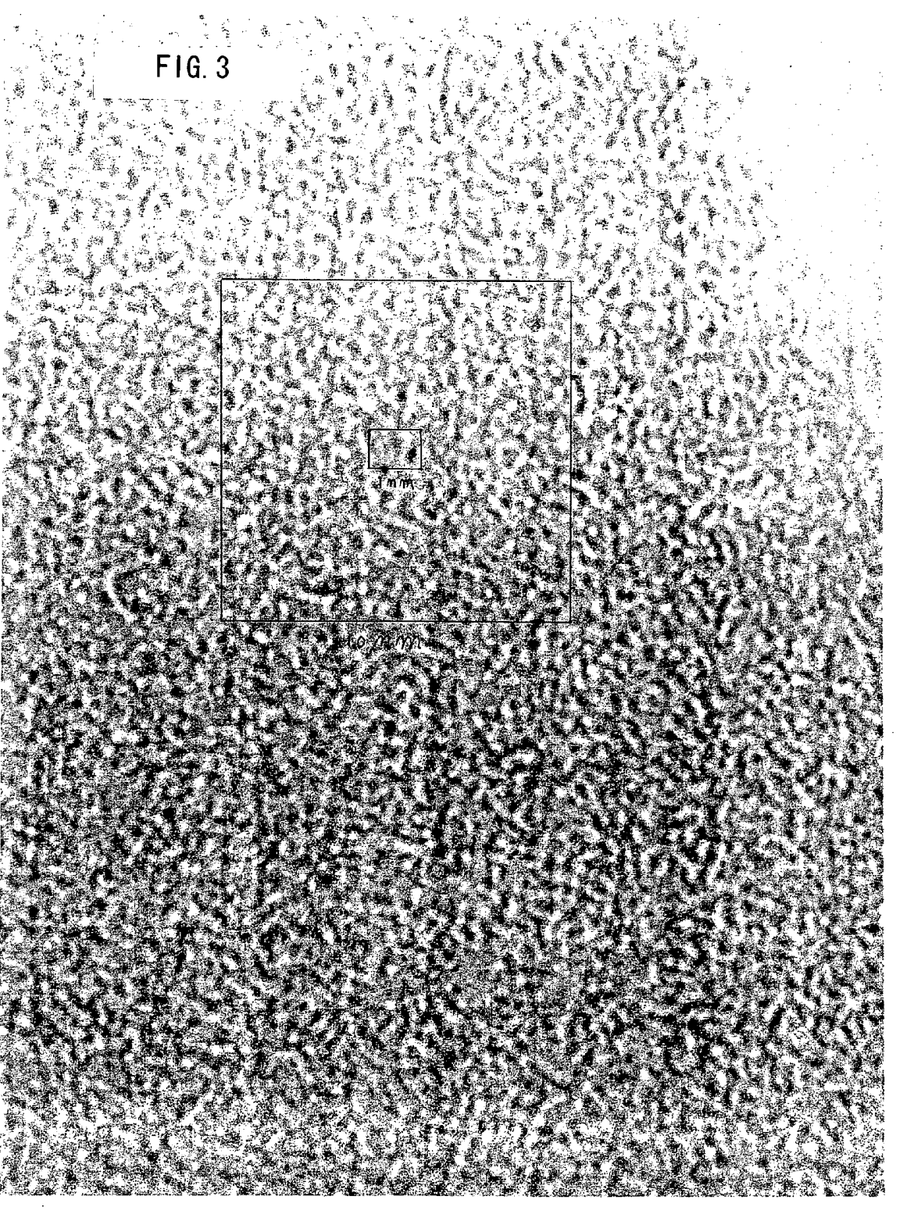
FIG. 3 is an enlarged micrograph of FIG. 2.

FIG. 2 is a photograph of an atomic carbon material in the present invention at a magnification of two million times by using a high resolution transmission electron microscope from Toray Research Center Inc. FIG. 3 is an enlarged micrograph of FIG. 2, and, in this figure, there are innumerable amorphous materials within 10 nm. Carbons from about one angstrom to about 2 nm at the largest are congregated within 10 nm and the average size is 1.66 angstroms. According to the diameter of carbon, one angstrom means one carbon C and a rod-shaped one of 2 nm means that from 5 to 7 carbons are linearly combined, so that it is understood that it is an organic material which does not consist of a graphite carbon hexahedral structure.

Figure 4:
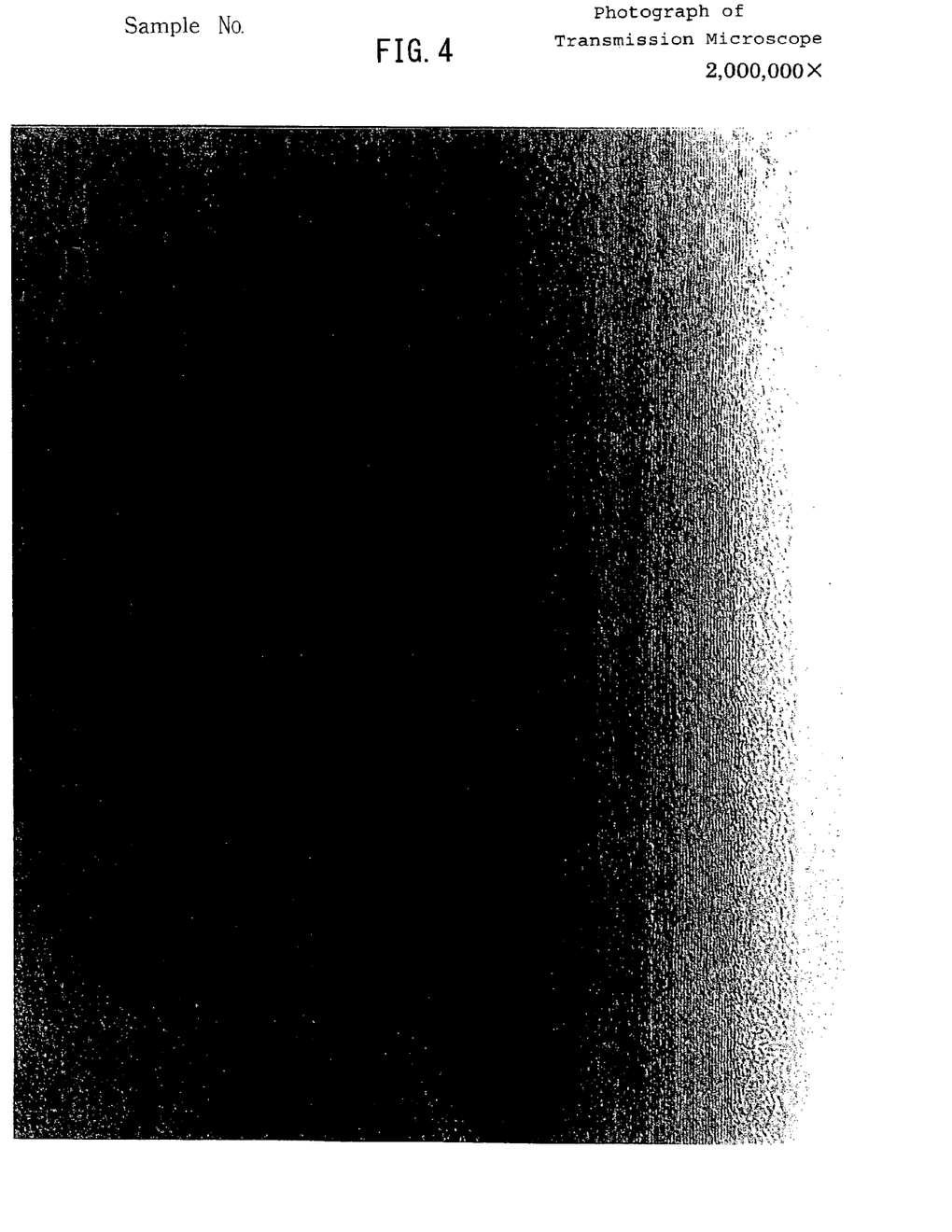
FIG. 4 is an electron micrograph of a carbon material at a magnification of two million times when it is cured for a short time at 550 C under the same conditions as those of the aforementioned preparation method.
Figure 5:
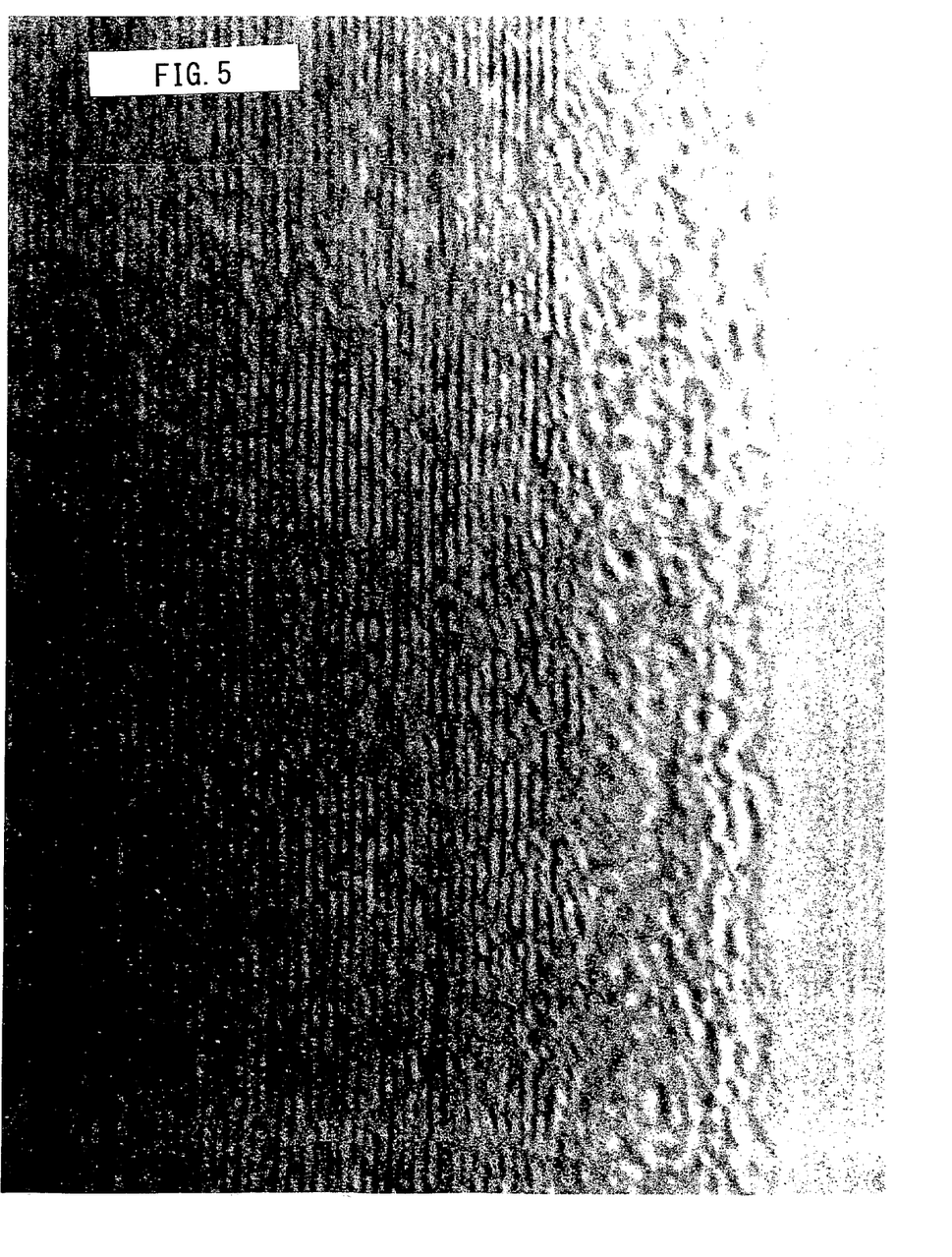
FIG. 5 is an enlarged micrograph of FIG. 4.

FIG. 4 is a photograph at a magnification of two million times when the carbon shown in FIGS. 2 and 3 is heated at 550 C for 30 minutes. FIG. 5 is an enlarged micrograph of FIG. 4 illustrating that carbon is aligned in a lateral direction from the surface and forms graphite. Therefore, it is understood that graphitization proceeds dramatically under a condition of temperatures higher than 450 C and the carbon is crystallized to change into inorganic carbon. As a result, the characteristics of an organic material which exists in the atomic carbon material of the present invention are lost.

Figure 6:
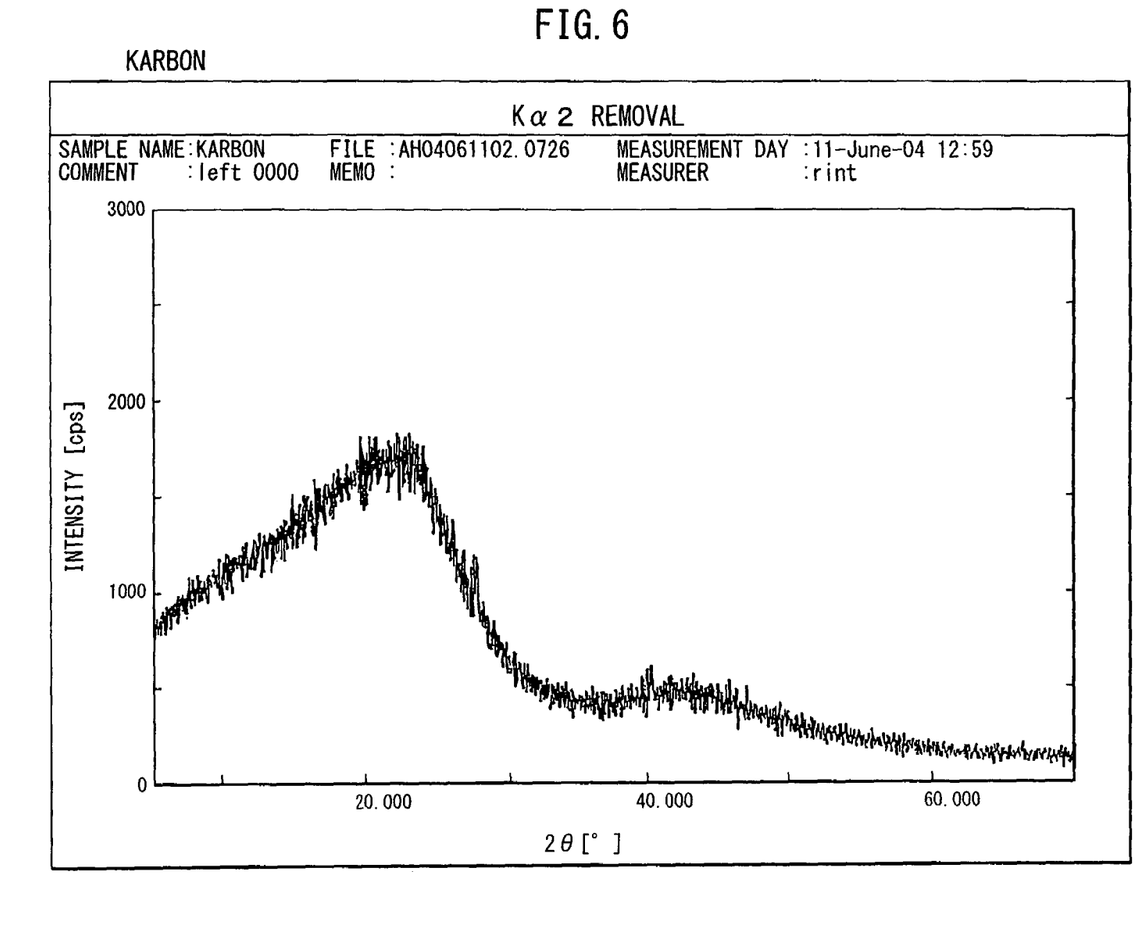
FIG. 6 is a chart illustrating a result of X-ray diffraction analysis of an atomic carbon material in the present invention.

FIG. 6 is a spectral chart illustrating a result of X-ray diffraction analysis of the atomic carbon material of the present invention by using an X-ray diffractometer in the Ehime office of Sumica Chemical Analysis Services, Ltd. According to the analyses shown in FIGS. 2 to 6, it was confirmed that the atomic carbon materials of the present invention were both amorphous and atomic organic carbons (they are submitted as attached document 1 and attached document 2).

Figure 7:
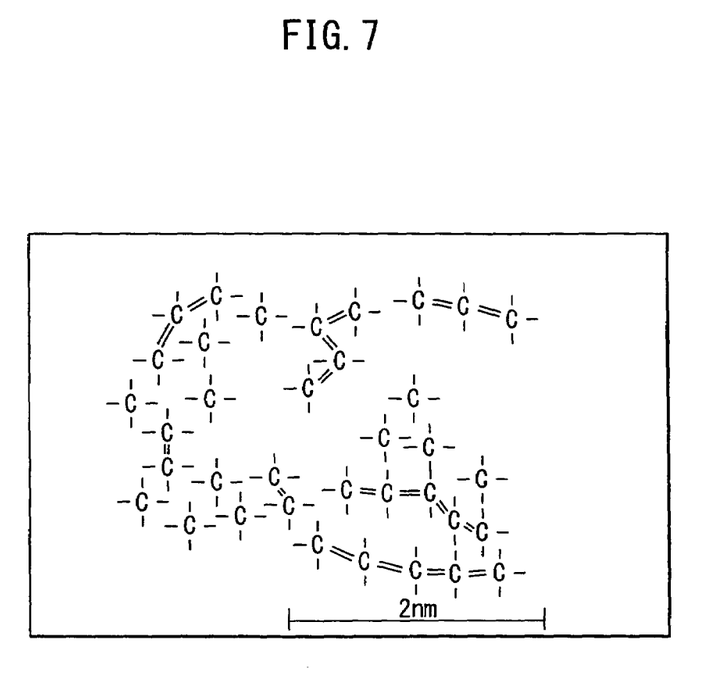
FIG. 7 is a drawing schematically illustrating an atomic carbon material in the present invention using atomic symbols.

FIG. 7 is a drawing schematically illustrating an atomic carbon material in the present invention using atomic symbols based on the sp orbits of carbon referring to the photograph of FIG. 3. It is known that carbon has physically four electrons and innumerous combinations necessary for vital activities and material configurations can be created. Although the activity of electrons generates various energy, electrons are lost or the number is decreased by crystallization, resulting in it becoming impossible for it to bond to various other materials.

In an atomic carbon material of the present invention, if C exists in 1, it has four electrons and ten electrons can be active, so that the ion adsorption ability thereof reaches from three times to twenty four times that of typical graphite. Moreover, if C of the atomic carbon material of the present invention exists in 1, it is in a state close to an atom with the particle size being 1 nm or less (theoretically 1.66 angstroms) so that it has the ability where four ions are adsorbed per one carbon atom as shown in FIG. 7. Therefore, the atomic carbon material of the present invention has the ion adsorption ability four times the ion adsorption ability of fullerene 60 which is composed of sixty carbon atoms. Moreover, the atomic carbon material of the present invention has the ion adsorption ability four times the ion adsorption ability of carbon nano-tube 1000 which is composed of a thousand carbon atoms, that is 4000, so that it is extremely active and utilized for various applications. Furthermore, the atomic carbon material of the present invention, which is different from a conventional graphitized carbon, is particulate or ultra fine particulate, and not only is it fine but also it can form compounds with various materials. Furthermore, being composed of carbon, since it does not possess toxicity relative to the human body, a variety of excellent applications in medicine, health care materials, and beauty products, etc. can be expected.

Figure 8:
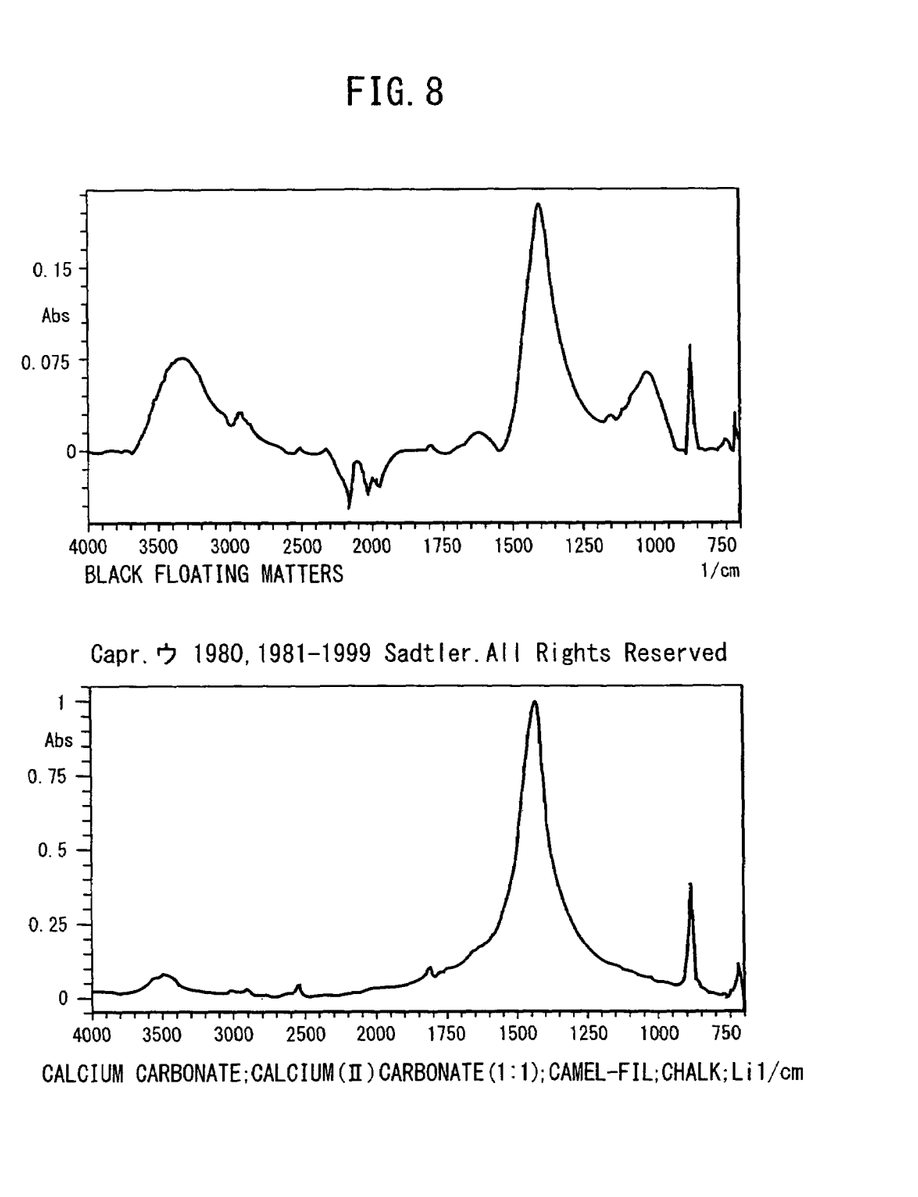
FIG. 8 is spectral measurement charts of water in which an atomic carbon material of the present invention is added.

FIG. 8 shows spectral measurement charts of one, in which a particulate atomic carbon material of the present invention is added into tap water, by using a diamond prism. (It is submitted as attached document 3.)

According to this measurement result, carbonate can be observed but carbon cannot be observed. Therefore, the atomic carbon material of the present invention is not one which is graphitized like well-known charcoal, that is, six carbons being cyclically bonded to each other, but it is one which ionizes in water and is bonded to hydrogen ions existing in water, so that it is understood that the atomic carbon material of the present invention has totally different features from a carbide from a conventional organic material.

Moreover, when the electrical conductivity of a bulk atomic carbon material of the present invention is examined, current is not detected. It indicates that it is a complete insulator.

The present invention has been described based on a preferable embodiment referring to the drawings. However, it is clear that this invention may be easily changed or modified by a person skilled in the art, and it is intended that such changed parts are also included within the scope of the invention.

What is claimed is:

1. A method for producing an atomic carbon material comprising:
   a first step of injecting inert gas into an airtight chamber containing a raw material composed of an organic material which has covalent bonds and replacing the atmosphere in the chamber with a nitrogen atmosphere;
   a second step of heating the raw material in the chamber to a temperature between 100-150° C. and controlling said temperature of 100-150° C. for a period of time sufficient to substantially complete evaporation of the water content from the raw material and complete extraction and removal of the evaporated water (water vapor) of the raw material out of the chamber to provide a fully dried raw material,
   a third step of injecting an amount of inactive gas equal to the amount of gas removed in the second step to keep the inside of the chamber in a state of an airtight nitrogen atmosphere;
   a fourth step of heating the fully dried raw material while step by step increasing from the temperature of 100-150° C. up to a temperature of 350 and not to exceed 450° C., to provide raw carbon, and individually separating resultant elements except for carbon in the oxygen-free atmosphere and the organic material from being bonded with carbon by thermally decomposing in order from an element having a lower decomposition temperature at a temperature of 450° C. or lower and exhausting the elements each time of separation to outside of the nitrogen atmosphere under a condition where the nitrogen atmosphere is maintained;
   a fifth step of injecting the nitrogen gas in the same amount as that of the exhausted elements to keep the inside of the chamber air tight and containing a nitrogen atmosphere; and
   sealing the obtained bulk atomic carbon in a predetermined chamber under a condition where the nitrogen atmosphere is maintained.

2. The method for producing an atomic carbon material according to claim 1, wherein an atomic carbon material is ground to be ultra fine particles in a nitrogen atmosphere at 450° C. or lower in a process before taking it in the chamber in a sealed state.

3. The method for producing an atomic carbon material according to claim 2, wherein the raw material is a wood or bamboo material.

4. The method for producing an atomic carbon material according to claim 1, wherein the raw material is a wood or bamboo material.

5. The method of claim 1, wherein the inactive gas used in the fifth step is cold nitrogen, with simultaneous removal of hot nitrogen gas from the fourth step, and preventing conversion of the carbon to graphite.

* * * * *